United States Patent [19]

Yant et al.

[11] Patent Number: 4,504,456

[45] Date of Patent: Mar. 12, 1985

[54] PROCESS AND APPARATUS FOR THE MANUFACTURE OF HYPROCHLOROUS ACID

[75] Inventors: Robert E. Yant, Medina; Richard J. Galluch, Hudson, both of Ohio

[73] Assignee: Quantum Technologies, Inc., Twinsburg, Ohio

[21] Appl. No.: 527,000

[22] Filed: Aug. 29, 1983

[51] Int. Cl.³ .............................................. C01B 11/04
[52] U.S. Cl. .................................. 423/473; 423/240; 423/DIG. 16
[58] Field of Search .................. 423/473, 499, 240 R, 423/DIG. 16

[56] References Cited

U.S. PATENT DOCUMENTS

| | | | |
|---|---|---|---|
| 1,510,790 | 10/1924 | McElroy | 423/462 |
| 2,157,524 | 5/1939 | Cady | 423/462 |
| 2,157,525 | 5/1939 | Cady | 423/462 |
| 2,178,696 | 12/1939 | Muskat | 423/462 |
| 2,240,344 | 4/1941 | Muskat | 423/473 |
| 2,347,151 | 4/1944 | Crawford et al. | 423/473 |
| 3,856,921 | 12/1974 | Shrier et al. | 423/240 R |
| 3,896,213 | 7/1975 | Hirdler | 423/499 |
| 3,914,397 | 10/1975 | Mueller | 423/462 |
| 4,190,638 | 2/1980 | Hoekje | 423/473 |

Primary Examiner—John Doll
Assistant Examiner—Steven Capella
Attorney, Agent, or Firm—Watts, Hoffmann, Fisher & Heinke Co.

[57] ABSTRACT

A process and apparatus for the manufacture of chloride-free hypochlorous acid using hydrolyzing of chlorine with steam and water vapor, solid-gas stripping of the co-generated hydrochloric acid vapor in a fluidized bed reactor, equilibrium discharge of chloride particulate from the bed of the reactor, selective dissolving of the hypochlorous acid vapor into aqueous product solution in a packed bed absorber, and closed-loop recycling of the stripped product stream.

11 Claims, 1 Drawing Figure

PROCESS AND APPARATUS FOR THE MANUFACTURE OF HYPROCHLOROUS ACID

BACKGROUND

The present invention relates to the manufacture of hypochlorous acid and, in particular, a process and apparatus for the on-site manufacture of hypochlorous acid in a salt-free solution.

Hypochlorous acid has long been contemplated as a multipurpose processing agent and chemical intermediate. Because of its powerful and selective oxidation properties, hypochlorous acid has been proposed for the bleaching of pulp and textiles, particularly as described in U.S. Pat. No. 2,178,696 entitled "Material Treatment" and issued on Nov. 7, 1939. It has also been proposed for the manufacture of hypochlorites, chlorohydrins and chloroisocyanurates, also because it is such a powerful oxidant, particularly as described in U.S. Pat. No. 1,510,790 entitled "Manufacture of Chlorohydrins" and issued on Oct. 7, 1924.

Hypochlorous acid has also been thought to be the active bacteria and microorganism killing species in water treatment through application of chlorine, hypochlorites or chloroisocyanurates, particularly as described in "The Handbook of Chlorination" by G. E. White in the 1972 edition.

Notwithstanding the recognition of hypochlorous acid as a desireable chemical agent and intermediate, the commercial use thereof has been limited because of its inherent properties and the difficulty in manufacturing a suitably pure product in a competitive economical process.

Hypochlorous acid is a relatively unstable compound. In even a dilute form, the solution decomposes with increasing rapidity as the temperature increases. It also decomposes upon exposure to light. This requires that shipment of commercial quantities from off-site locations take place under tightly controlled temperature, container and timetable restrictions. The shipping also must be substantially in accordace with demand to limit the change in chemical quality from the time of manufacture to the time of use. The problems of concentration are particularly troublesome inasmuch as the product can be explosive in concentrated solution. These problems are further accentuated if the solution contains impurites such as chlorides or chlorates.

Thus the preference for the commercial use of hypochlorous acid has been for on-site manufacture in accordance with the compound demand. These efforts have been typified by complex and capital intensive processes and apparatus. They have also been troubled by the complexities in obtaining the required product purity.

It has also been proposed that the hypochlorous acid be directly prepared by reaction of chlorine and water or reaction of a chlorine solution with a strong base such as caustic or lime. While both of these approaches produce the solution, they also produce undesireable chlorides which increase the decomposition rate, complicate the subsequent manufacturing processes and require the aforementioned prompt usage and storage conditions.

It has also been proposed to produce the hypochlorous acid solution through the intermediate chlorine monoxide, as disclosed in U.S. Pat. No. 2,157,524 and 2,157,525, both issued on May 9, 1939, and thereafter dissolving the chlorine monoxide in water to form the acid solution. Such a solution, however, contains the undesireable chlorides.

Additionally, it has been proposed to react the chlorine monoxide with sodium carbonate to form hypochlorous acid vapor which is then dissolved into solution as described in U.S. Pat. No. 2,240,344 issued on Apr. 29, 1941. In commercial use the process has been modified to use steam as a supplemental water source and to use anhydrous sodium carbonate as a reactant, still using the elaborate towers or tumbling reactors. However, both approaches yield only a low conversion to chlorine monoxide with a substantial amount of unreacted chlorine, thus being limited to those facilities having a sufficiently large on-site demand to justify the investment.

A large unsatisfied demand thus exists for a simple, high yield process and apparatus adaptable for varying production needs which can produce on-site a chloride-free hypochlorous acid solution.

SUMMARY OF THE INVENTION

The present invention overcomes the aforementioned problems associated with the prior process by providing an on-site, salt-free, closed-loop process and apparatus for producing hypochlorous acid solution in desired concentration without an intermediate product in a compact system which operates with a high conversion efficiency.

More particularly, the present invention provides for the direct formation of gaseous hypochlorous acid, without an intermediate such as chlorine monoxide, by the stoichiometric hydrolysis of chlorine with steam in the presence of recycled carbon dioxide and water vapor. This reaction additionally produces hydrochloric acid in the vapor phase and is substantially free of water vapor.

The reacted fluid stream is conveyed to a fluidized bed reactor. The fluid stream fluidizes a particulate bed comprising an admixture of reactant and conversion particulates. The reactant is aparticulate chloride forming base such as anhydrous sodium carbonate which is conveyed to the reactor as a raw material. The conditions at the reactor effect a solid-gas reaction between the hydrochloric acid vapor and the base to form the conversion particulate, sodium chloride, which is then in fluidized admixture with the unreacted base. Particulate sodium bicarbonate may also be formed as a secondary conversion particulate. A particulate admixture containing sodium chloride is withdrawn from the bed so as to establish equilibrium bed conditions and to remove salts from the process.

The stripped fluid stream comprising now the hypochlorous acid, the recycled and co-generated carbon dioxide from the bed reaction is conveyed to a cyclone separator which remove any particulate fines which may have escaped the bed. The separator thus removes another source of impurities from the final product.

The fluid stream, stripped of particulate fines, is then conveyed to a countercurrent packed bed absorber. Therein the hypochlorous acid vapor is dissolved to the desire d concentration in the feed water and discharged as product solution for on-site, on-demand usage. The exiting stream now comprising carbon dioxide saturated with water vapor and substantially free of unreacted chlorine is recycled to the hydrolysis reaction zone. Excess carbon dioxide is vented through a caustic scrubber to produce a vent gas free of chlorine.

The fluidized bed and the complete hydrolysis reaction permit an extremely compact process equipment package in contrast to the massive constructions of the prior processes. The entire process is adaptable to skid-mounted modular design which may be transported by common carrier and which requires only connection to house materials and utilities.

Accordingly, it is an object of the present invention to provide a compact closed-loop system for directly producing hypochlorous acid through hydrolysis of chlorine without intermediate chlorine containing products, and purifying the reactant stream using a solid-gas fluidized bed reaction.

A further object of the present invention is to provide a process for producing hypochlorous acid by the hydrolysis of chlorine with steam and conveying the vaporous reactant in a diluent stream to a fluidized bed reactor for solid-gas reactant stripping of the chlorides by a chloride forming base.

Another object of the present invention is to provide a process for making hypochlorous acid by the instantaneous stoichiometric hydrolysis of chlorine with heated water vapor followed by a solid-gas reaction to form chloride salt and thereafter by selective dissolving of only the hypochlorous acid vapor to form the acid solution.

Yet another object of the present invention is to provide a closed-loop process using fluidized bed reaction to produce a chloride-free hypochlorous acid solution on a continuous basis by direct hydrolysis of chlorine with steam and recycled water vapor in stoichiometric ratios in a recycled stream of co-generated carbon dioxide to produce hypochlorous acid and hydrochloric acid in the vapor phase and substantially free of water vapor and unreacted chlorine, the product stream being used to fluidize a reactant bed of anhydrous sodium carbonate which reacts with the hydrochloric acid vapor to produce particulate sodium chloride and thus remove a chloride source from the fluid stream, the sodium chloride being withdrawn at an equilibrium rate in free-flowing form, any suspended material being removed by a particulate separating device, the resultant stream being concentrated into aqueous solution in a packed bed absorber with the remaining carbon dioxide being recycled to the process.

A still further object of the present invention is to provide a compact process and apparatus for the manufacture of hypochlorous acid solution in salt-free form and on-site in desired concentration by effecting direct hydrolysis of chlorine, removal of chlorides in a fluidized bed reactor, and concentration of the hypochlorous acid vapor in a packed bed absorber to produce a product solution followed by recycle of the fluid stream to effect closed-loop operation.

These and other objects of the present invention will be apparent to those skilled in the art by reference to the following detailed description of a preferred embodiment of the invention taken in conjunction with the accompanying drawing in which the single FIGURE is a process flow diagram of a process for producing salt-free hypochlorous acid solution.

DETAILED DESCRIPTION OF THE INVENTION

Figure 1:
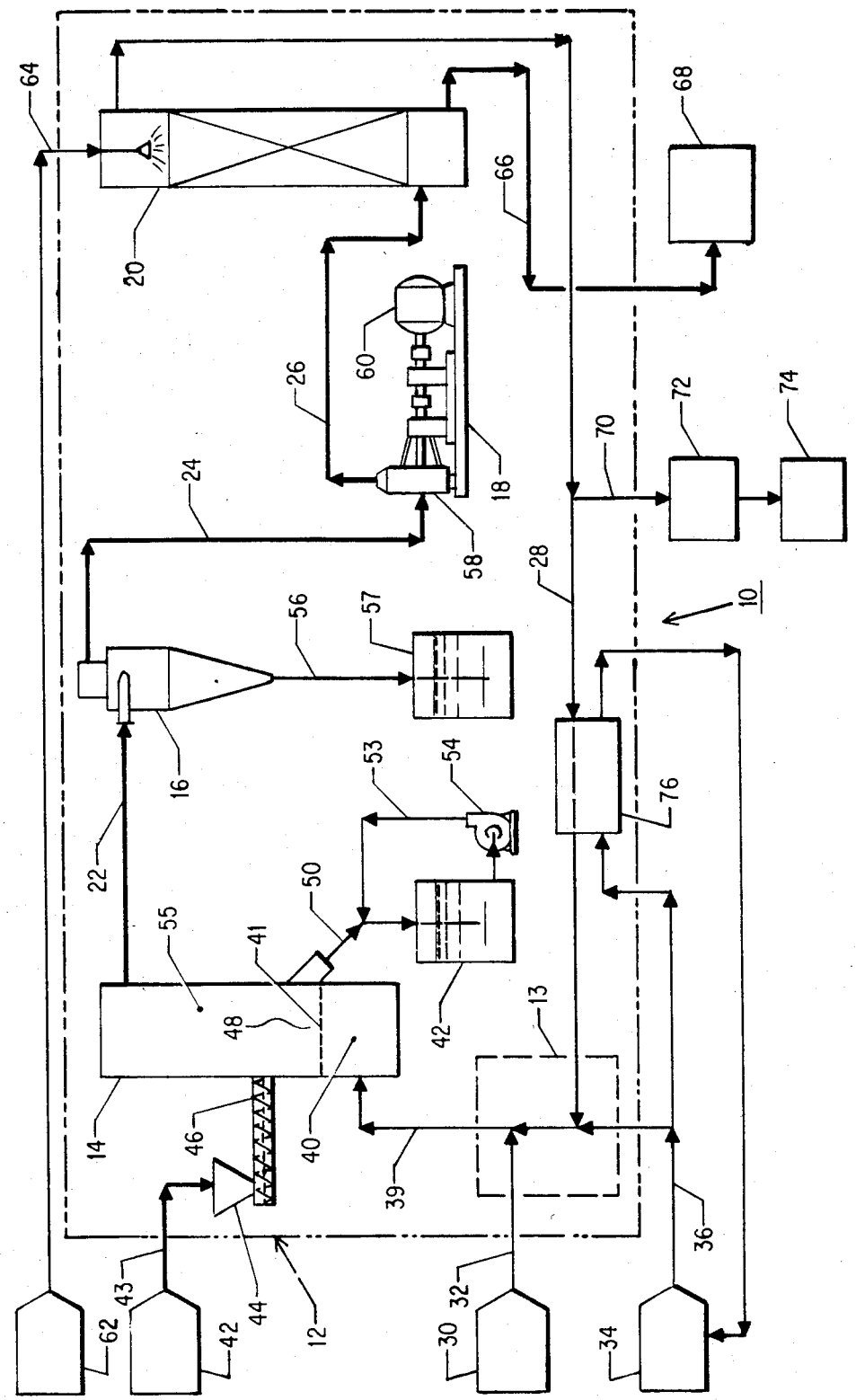

Referring to the drawing, there is shown a process and apparatus, generally indicated by the numeral 10, and within the battery limits 12 indicated by the dotted lines, which as hereinafter described produces a chloride-free hypochlorous acid solution in a closed-loop system.

The process and apparatus 10 comprises serially connected major components including a two-stage hypochlorous acid generator consisting of a hydrolysis reactor 13 and a fluid bed reactor 14, a cyclone separator 16, a fan unit 18 and a packed bed absorber 20, all of which are respectively fluidly connected by conduits 22, 24, 26 and 28.

Materials and utilities are supplied from house sources outside the system and battery limits 12, although it will be appreciated that the process and apparatus 10 lends itself to modular construction which can accomodate captive generating and supply sources.

Dry chlorine gas is supplied from a chlorine supply 30 through conduit 32 to the hydrolysis reactor 13 upstream of the fluid bed reactor 14. Steam is supplied from a steam boiler 34 through conduit 36 to the hydrolysis reactor 13 upstream of the conduit 32 and the fluid bed reactor 14. Inasmuch as the reaction proceeds rapidly within an extremely compact zone, it will be appreciated that the relative locations of the steam and chlorine supply inlets may be interchanged.

The recycle conduit 28 is fluidly connected to the hydrolysis reactor 13 upstream of the chlorine supply conduit 32. The recycle conduit 28 conveys a recycle diluent stream comprising substantially saturated carbon dioxide to the hydrolysis reactor 13. The reactor 13 may constitute a continuation of the recycle conduit 28 or may be an independent assembly appropriately connected.

The chlorine and steam are supplied to the reactor 13 under the control and monitoring of suitable valving and instrumentation, not shown, of a commercially available type.

The chlorine is supplied in dry form with less than 200 ppm. water in order to limit the corrosive properties thereof. The chlorine is delivered to the primary reaction zone of the reactor at ambient temperature.

The steam is supplied to the reactor by way of example at 55 psig.

The chlorine and steam are supplied at the ratios described below. The chlorine undergoes substantially instantaneous hydrolysis to produce, depending on the applied ratios, a gaseous admixture of hypochlorous acid and hydrochloric acid which is substantially free of water vapor in accordance with the equilibrium reaction:

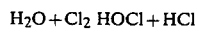
$$H_2O + Cl_2 \rightleftharpoons HOCl + HCl$$

The chlorine and steam are prefereably supplied to the generator at a stoichiometric ratio for the production of hypochlorous acid. In order to achieve this efficient operating mode, chlorine is supplied to the reactor 13 slightly in excess of the amount required for complete hydrolysis with the available water comprising the steam and the water vapor in the saturated recycle stream. Accordingly, a minor portion of unreacted chlorine enters the fluid bed reactor under this mode.

As hereinafter described, the unreacted chlorine undergoes a further hydrolysis with the water co-generated in the bed reaction such that the exiting stream has substantially no unreacted chlorine. On the other hand, any unreacted chlorine will be sufficient to scavenge the bed water as set forth below. Any remaining bed water will be converted to sodium bicarbonate by reaction with the sodium carbonate also as set forth below.

It is nonetheless appreciated that water vapor can be utilized and accomodated to an extent in the bed as long as the fluidization and discharge is not extinguished.

By way of example, with a diluent flow of saturated carbon dioxide of 200 cfm, the hydrolysis reaction can take place within the confines of a reactor having a 4 inch inner diameter and a reaction zone length of not more than 18 inches to produce a hypochlorous acid mixture. The reactor is preferably a polyvinyl chloride pipe or other suitably corrosion resisitant material.

The terminal portion 39 of the reactor 13 is fluidly connected to a lower plenum chamber 40 of the generally cylindrical fluid bed reactor 14. The upper end of the plenum 40 is defined by a fluid pervious support plate allowing low restrictive passage of the fluid stream while preventing downward migration of the bed particulates. A suitable material is polytetrafluoroethylene mesh.

The fluid bed reactor 14 is supplied with commercial grade anhydrous sodium carbonate from a supply source 42. The sodium carbonate or other chloride forming base such as those mentioned below is delivered through a feed conduit 43 to a hopper 44 for metered discharge by a screw conveyor 46 to a vertically intermediate portion of the reactor 14 above the operational level of the fluidized bed 48.

The fluidized bed 48 serves as a solid-gas reaction zone between the vaporous hydrochloric acid and the chloride forming base. The solid-gas reaction strips the hydrochloric acid vapor from the reaction fluid stream by direct conversion to the chloride salt, sodium chloride. Carbon dioxide and water vapor are co-generated according to the reaction:

$$2HCl + Na_2CO_3 \rightarrow 2NaCl + CO_2 + H_2O$$

The unreacted chlorine in the fluid stream is hydrolyzed with the co-generated water vapor. Any remaining co-generated water vapor is converted into sodium bicarbonate according to the reaction:

$$H_2O + CO_2 + Na_2CO_3 \rightarrow 2NaHCO_3$$

Other suitable chloride forming bases of the alkaline metals such as potassium, caustic soda, lime, limestone or the like may likewise be used in the bed provided they have a particle size and distribution suitable for fluidization.

Because the initial hydrolysis resulted in a water-limited reaction, the sodium carbonate is non-hydrated and the co-generated water is scavenged by the above secondary reaction, the resultant salt in admixture with the unreacted base is in free flowing form. In general, a hydrated form of ash with its water of crystallization would present excess water to the bed and negatively affect fluidization.

The bed 48 is maintained in the fluidized state by a fluid stream flow which establishes a pressure drop therethrough equal to the static weight of the bed charge, all in accordance with conventional techniques.

An equilibrium bed height is maintained under the above-mentioned conditions by gravity overflow discharge from the bed 48 through drain conduit 50. The drain conduit 50 empties into a liquid sump 52 for ultimate removal and disposal or reuse as acceptable for the site. The inlet to the drain conduit 50 is positioned at the periphery or interior of the bed at a position which best facilitates free flowing discharge and maximum removal of the salt. The most beneficial location will be dependent on the actual particulate distribution for a given bed design.

A recirculation conduit 53 including a pump 54 continuously flushes the conduit 50 to assist the discharge. The discharge may be further assisted by inclining the conduit 50 greater than the angle of repose for the bed particulates.

The sodium carbonate is fed to the bed at a rate in excess stoichiometry in order to ensure complete conversion of the hydrochloric acid. An insufficiency will cause a reduction in process efficiency and chloride contamination of the resultant product solution.

The fluid bed reactor 14, like all process stream components, is constructed of a suitable corrosion resistant material such as polyvinyl chloride, fiberglass reinforced polyester or titanium or the like.

For a primary reaction zone flow rate of 200 cfm comprising 5% hypochlorous acid vapor, 5% hydrochloric acid vapor, and 5% unreacted chlorine vapor in the carbon dioxide recirculant stream, a reactor chamber having an internal diameter of 36 inches and an operational bed height of 6 inches has been used to convert the reactant stream free of salt when fed with sodium carbonate at a rate of 2.4 lb/min. The salt discharge was in excess of 35% sodium chloride and subject to optimization.

The co-generated vaporous products of the bed reaction, carbon dioxide and water vapor, together with the recycled carbon dioxide diluent and the hypochlorous acid vapor flow to an upper bed plenum 55. The upper bed plenum 55 has a height selected to maximize particle disengagement from the fluid stream.

The upper bed plenum 55 is fluidly connected by the conduit 22 to the inlet port of the cyclone separator 16. The separator 16 removes any particulate fines which have exited the bed. These fines are discharged from the separator through drain conduit 56 to a liquid sump 57 for ultimate removal from the system in an acceptable manner for the operating site.

The cyclone separator 16 by removing the particulate fines insures that the resultant product solution is free from dissolvable chlorides or chlorates otherwise generated. The separator may be any suitable commercially available design for achieving the above conditions.

The product stream now stripped of particulate fines discharges from the outlet port of the separator through conduit 24 to the inlet port of a centrifugal fan 58 of the fan unit 18. The fan 58 is driven by electric motor 60 and serves to reestablish process stream flow pressure after the pressure drops of the fluid bed and the separator. It is preferred to locate the fan 58 downstream of the reactors and the separator so as to maintain a substantially neutral pressurization therewithin thereby containing the reactants within the vessels. The fan 58 may be alternatively located in the recycle conduit 28. A suitable commercially available fan would produce a flow rate of 200 to 800 cfm. at a differential pressure required to overcome the pressure drop of the system.

The repressurized product stream flows from the discharge port of the fan 58 to an inlet port at the lower end of the packed bed absorbed 20. The absorber may be of any suitable countercurrent design of resistant material such as polyvinyl chloride, fiberglass reinforced polyester, titanium or the like. The interior is filled with a high void material such as polyvinyl chloride commercial type packing. Cooling water is delivered from house water supply 62 to an inlet at the upper end of the absorber 20.

The hypochlorous acid vapor, together with any anhydride which may have been formed in equilibrium therewith, is selectively dissolved into the cooling water as it reversely flows through the packed bed. The water flow rate is selected to establish the desired concentration of the hypochlorous acid solution based on the flow rate and concentration of the product stream. The product solution is discharged through a product drain conduit 66 at the lower end of the absorber. The drain conduit 66 discharges to a storage reservoir 68 external of the battery limits 12.

The fluid stream from the packed bed absorbed 20, now stripped of product and comprising essentially saturated carbon dioxide, is discharged from the upper end of the absorber to the conduit 28. Depending on the process ratios, the fluid stream may also contain minor amount of unreacted chlorine.

Inasmuch as the continuous generation of carbon dioxide in the process is in excess of that required for closed-loop operation, the excess is vented external of the process through vent 72. The vent 72 is fluidly connected to a caustic scrubber 74 for removing any remaining chlorine from the vent gases prior to discharge or secondary use. Depending on other site uses of chlorine, the same may be directly routed to the secondary use site.

The fluid stream recycle conduit 28, as previously mentioned, is connected to the inlet of the hydrolysis reactor 13 for closed-loop operation.

If desired, the fluid stream of the recycle conduit 28 may be heated by a heat exchanger 76 to raise the entrant temperature to the reactor 14 and thereby lower the relative humidity of the bed 48 so as to further enhance the fluidization thereof. the boiler 34 or other suitable heat source may be used for the input to the heat exchanger 76. As further regards the ratios of raw materials, for optimum efficiency, the chlorine, water and sodium carbonate will be supplied in stoichiometric proportions for the two-stage hydrolysis and the fluid bed reactions such that the fluid stream exiting the fluid bed is free of unreacted chlorine and dissolvable chlorides and/or chlorates.

Thus, ideally the available water vapor from the recycled saturated carbon dioxide and the steam is sufficient for hydrolysis of a portion of the entering chlorine. The remaining unreacted portion is then secondarily hydrolyzed with the liberated water vapor from the bed reactions.

For a chlorine rich proportioning, unreacted chlorine will be recycled. This will lower the overall process efficiency and will prevent chlorine in the vent gases. Nonetheless, this operating mode may be acceptable while deriving the benefits of the present invention.

For a water rich proportioning, the unreacted chlorine entering the fluid bed is less than the amount available for the secondary hydrolysis with the co-generated water. Thus only a portion of the water is so consumed. The remainder undergoes further bed reactions, for instance to sodium bicarbonate, or increases the relative humidity of the bed. This mode also may be nonetheless acceptable for the production site. Excess bed water, however, can impair proper fluidization of the bed.

The sodium carbonate is fed to the bed in equilibrium with the bed discharge and preferably at a rate in excess of stoichiometry to promote complete reaction with the hydrochloric acid. The extent of the feed rate will again be dependent on site demands and conditions.

Under operating test conditions, a diluent flow of 200 cfm. at 60° F. of saturated carbon dioxide was delivered through the conduit 28 to the hydrolysis reactor 13. Thereat, 25 lb/hr or saturated steam at 55 psig was combined with 120 lb/hr of dry chlorine gas at 45° F. The reactor 13 had a 4 inch inner diameter and was 18 inches long.

The reactant stream entered the fluid bed at an entry pressure of 5 in. $H_2O$, a flow rate of 200 cfm and an entry temperature of 80° to 90° F. This flow rate fluidized a particulate bed comprising an admixture of anhydrous sodium carbonate and sodium chloride at an operational bed height of 6 in. and an operational bed diameter of 36 in. Sodium carbonate was fed at ambient temperature at a rate of 2.4 pounds per minute. The discharge comprised a substantial amount of sodium chloride.

The stripped reactant stream comprising the hypochlorous acid and carbon dioxide exited the bed at 100° to 110° F. and at −5 in. $H_2O$.

The stream was repressurized at the fan prior to entry to the absorber.

Water entered the packed bed absorber at 55° F. and at a flow rate of 13 gpm. A hypochlorous acid solution was accumulated at a rate of 117 lb/hr and at concentration of 18 grams per liter.

The recycle stream was suitably vented to maintain steady state operating conditions at the reactors.

No observable chlorine was discharged at the vent.

An analysis of the bed discharge determined the presence of sodium bicarbonate indicating a water rich proportioning.

In a further test, the bed was operated at a pressure differential of 4 to 5 in. $H_2O$ with an above bed pressure of −6.0 in. $H_2O$ and a bed temperature of 115° F.

Chlorine was supplied at a rate of 2 lb/min. Steam was supplied at 2.6 lb/min. The entry temperature to the bed was 80° F.

The resultant product solution indicated a hypochlorous acid concentration of 18 grams per liter.

The bed was found to be dry and free flowing without any noticeable moisture. A bed analysis indicated a 26% sodium carbonate, 37% sodium bicarbonate and 37% sodium chloride.

Various modifications and variations of the invention will be apparent to those skilled in the art in light of the foregoing disclosure. Therefore, it is to be understood that, within the scope of the appended claims, the invention can be practiced otherwise than as specifically shown and described.

We claim:

1. A process of making hypochlorous acid solution comprising the steps of:
   (a) reacting chlorine with steam to produce a gaseous admixture including hypochlorous acid and hydrochloric acid,
   (b) delivering said gaseous admixture to a fluidized bed comprising a chloride forming base,
   (c) passing said gaseous admixture through said bed to produce a solid-gas reaction stripping the hydrochloric acid vapor by conversion to a chloride salt and thereby forming a stripped reactant stream of hypochlorous acid vapor, and
   (d) forming a solution from said hypochlorous acid vapor.

2. The process as claimed in claim 1 wherein said chloride forming base is an alkaline metal carbonate, whereby said solid-gas reaction generates carbon dioxide that is included in said reactant stream, and wherein said carbon dioxide is recycled to said fluidized bed with said gaseous admixture.

3. The process as claimed in claim 2 wherein the carbon dioxide includes water vapor resulting from step (d), said water vapor being used in hydrolysis of said chlorine in step (a).

4. The process as claimed in claim 1 wherein step (d) is carried out by dissolving said hypochlorous acid vapor in water.

5. The process as claimed in claim 1 wherein step (d) is carried out by counter-flowing water and said reactant stream through a packed bed, and controlling the amount of water introduced to said packed bed in order to obtain a hypochlorous acid solution of the desired concentration.

6. The process as claimed in claim 1 wherein step (a) is carried out by supplying amounts of chlorine and steam such that said gaseous admixture is substantially free of water vapor.

7. A process of making hypochlorous acid solution comprising the steps of:
(a) reacting chlorine with steam in the presence of carbon dioxide to produce a gaseous admixture including hypochlorous acid vapor, hydrochloric acid vapor and carbon dioxide,
(b) delivering said gaseous admixture to a fluidized bed comprised of alkaline metal carbonate,
(c) passing said gaseous admixture through said bed to produce a solid-gas reaction stripping said hydrochloric acid vapor and generating an alkaline metal chloride, carbon dioxide and water vapor,
(d) passing said hypochlorous acid vapor and carbon dioxide from step (c) through an absorber in contact with water to produce hypochlorous acid solution and a discharge stream of carbon dioxide, and
(e) recycling a portion of said stream of carbon dioxide from step (d) to step (a).

8. The process as claimed in claim 7 wherein said gaseous admixture from step (a) contains sufficient chlorine gas to scavange substantially all of the water vapor produced in step (c).

9. The process as claimed in claim 8 wherein the gaseous stream passing to step (d) is substantially free of unreacted chlorine.

10. The process as claimed in claim 7 wherein the amount of water added to said absorber in step (d) is controlled to produce a hypochlorous acid solution of the desired concentration.

11. The process as claimed in claim 8 including the steps of adding alkaline metal carbonate to said fluidized bed and withdrawing mixed compound of alkaline metal carbonate and alkaline metal chloride at equilibrium rates.

* * * * *

UNITED STATES PATENT AND TRADEMARK OFFICE
CERTIFICATE OF CORRECTION

PATENT NO. : 4,504,456

DATED : March 12, 1985

INVENTOR(S) : Robert E. Yant and Richard J. Galluch

It is certified that error appears in the above-identified patent and that said Letters Patent is hereby corrected as shown below:

Column 3, line 59, "FIGURE" should read --figure--.

Column 6, line 64, "absorbed" should read --absorber--.

Column 7, line 15, "absorbed" should read --absorber--;
line 37, ". the" should read --. The--;
line 54, "prevent" should read --present--.

Column 8, line 6, "or" should read --of--.

Signed and Sealed this

Sixth Day of August 1985

[SEAL]

Attest:

DONALD J. QUIGG

Attesting Officer

Acting Commissioner of Patents and Trademarks